United States Patent Office 3,034,921

Patented May 15, 1962

3,034,921

METAL COATING AND METHOD OF MAKING THE SAME

Stanley H. Thompson, Hampton, Va., assignor to Maida Development Company, Hampton, Va., a corporation of New Jersey No Drawing. Filed Nov. 12, 1959, Ser. No. 852,170
10 Claims. (Cl. 117—54)

The present invention relates to the metal coating of ceramic dielectrics for the purpose of preparing ceramic capacitors.

In preparing ceramic capacitors, by the application of a conductive metal coating to a ceramic dielectric, it is important to have the metal coating intimately bonded to the ceramic so that the full dielectric constant of the ceramic may be utilized. Numerous procedures have previously been proposed for depositing the coating of conductive metal, e.g. copper, on the surface of the ceramic dielectric by electroplating or electroless plating means. Generally speaking, however, most of these prior techniques do not give an effectively strong bond between the conductive metal and the ceramic.

The principal object of the present invention is to provide a novel process for applying a conductive metallic coating, particularly a copper coating, to a ceramic dielectric base to obtain a highly satisfactory bond. A more specific object of the invention is to provide a process of the type indicated which gives an exceptional degree of adhesion sufficient to satisfy the requirements for ceramic capacitors or the like. Other objects will also be hereinafter apparent.

Broadly stated, the objects of the invention are accomplished by means of a process including the steps of: immersing the ceramic base in an aqueous solution of a metal fluoroborate and drying the same; thereafter heating the base to fuse the metal fluoborate coating to the base; and then coppering the thus coated ceramic in an electroless coppering solution.

The process of the invention may be diagrammatically illustrated as follows:

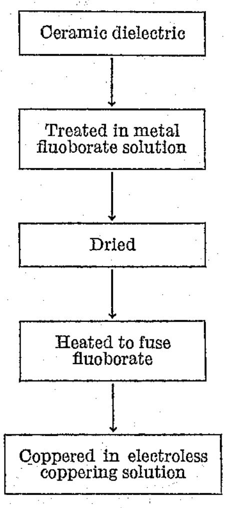

The success of the invention is due, at least to a significant extent, in the step of precoating or "sensitizing" the ceramic base with a thin layer of the fluoborate, in combination with the other steps described herein. When the fluoborate is heated to a sufficiently high temperature, in the order of 1000 to 1700° F. with 1400° F. to 1500° F. preferred, it sinters and bonds securely to the ceramic base. It has also been found that the resulting coating has the property of starting deposition on its surface of metallic copper from an electroless coppering solution.

The present invention may be used with any of the conventional fired ceramic dielectrics which are normally used for the preparation of ceramic capacitors. Thus, the ceramic base herein may comprise such materials as the titanates, zirconates and stannates of barium, calcium, magnesium, strontium, lead, etc., used either singly or mixed together in widely varying proportions with or without the addition of minor amounts of metallic oxides and/or silicates.

As suitable metal fluoborates, there may be used copper fluoborate, silver fluoborate, nickel fluoborate, tin fluoborate, lead fluoborate and the like.

The sensitizing operation may be carried out by immersing the ceramic in an aqueous solution of the metal fluoborate. This pretreatment may be carried out at a temperature of 40 to 200° F. for from ¼ to 8 hours although other temperature and time conditions may also be used. Desirably, the fluoborate solutions may have a fluoborate concentration in the range of 0.1 to 52% by weight, based on the weight of the solution.

After treating the ceramic in the fluoborate solution, the ceramic is withdrawn from solution and completely dried. The ceramic is then sintered by gradually heating, preferably to 1400–1500° F. although temperatures in the range of 1000°–1700° F. may be used as indicated before, to fuse the metal fluoborate coating to the ceramic. Usually, this heating operation is carried out for a period of from 1 to 30 minutes.

Drying of the ceramic, prior to sintering, may be carried out at any conveniently low temperature, e.g. 200–400° F. In order to obtain a desirably uniform, smooth surface, the base should be completely dried before reaching the sintering temperature.

The fluoborate sintering operation desirably provides a fused surface layer on the ceramic varying in thickness from 0.1 to 1 mil although thicknesses outside this range may be used. The sintering is desirably carried out in air although an atmosphere of inert gas such as nitrogen, may be utilized.

Upon completing the fluoborate coating, the ceramic is coppered in conventional fashion, by immersion in an electroless coppering solution. Conventional electroless coppering solutions may be used. For example, the solution may comprise a mixture of sodium hydroxide, Rochelle salt and copper sulphate with a small addition of formaldehyde to effect the desired deposition of copper. Open baths, operated at temperatures of the order of 60–90° F. may be used. The duration of the electroless coating operation can be varied, depending on the desired coating thickness and other factors, but usually a satisfactory coating can be obtained in from 1 to 2 hours. Typically, the copper layer may vary in thickness from 0.1 to 1.5 mils.

Before immersing the ceramic in the fluoborate solution, it is desirable to roughen up the surface thereof by chemical etching or equivalent means to improve fluoborate adherence. Sulphuric acid and/or hydrofluoric acid or the like may be used for this purpose depending on the ceramic composition.

The invention is illustrated, but not limited, by the following example, wherein percentages are by weight:

A fired ceramic dielectric consisting essentially of barium titanate (90%) and calcium zirconate (10%) was first etched with 50% sulfuric acid to roughen the surface for about two hours at room temperature (60–65° F.). The ceramic was then rinsed, dried and immersed in a 5–10% solution of silver fluoborate for a period of from one–two hours. The ceramic was then removed from the bath and thoroughly dried at room temperature.

The thoroughly dried ceramic was then heated to a temperature of 1450° F. to fuse the fluoborate to the base. Heating to 1450° F. was effected gradually, the peak temperature being reached after about 10 minutes. Heating at 1450° F. was retained for about five minutes to completely fuse the fluoborate to the ceramic base.

The fluoborate coated ceramic was then cooled to room temperature (60–65° F.) and then placed in the electroless coppering solution. In this case, the latter consisted of 10% sodium hydroxide, 30% Rochelle salt, about 10% copper sulphate, 0.1% formaldehyde and about 50% $H_2O$. The ceramic was left in the coppering solution for one–two hours at room temperature and thereafter removed, rinsed and dried. The ceramic was then made into a capacitor, the conductive copper coating being strongly adhered to the ceramic.

It will be appreciated that various modifications may be made in the invention described herein. Accordingly, the scope of the invention is defined in the following claims wherein I claim:

1. A process for applying an adherent copper coating to a ceramic dielectric which comprises immersing the ceramic in an aqueous solution of a metal fluoborate; removing said ceramic from said solution and drying the same; thereafter heating the ceramic to fuse the metal-fluoborate coating to the same; and applying a copper coating directly upon said fluoborate coating by coppering the thus fluoborate-coated ceramic in an electroless coppering solution.

2. The process of claim 1 wherein the ceramic is roughened by acid etching prior to immersing same in the fluoborate solution.

3. The process of claim 1 wherein the fluoborate is fused by heating to 1000–1700° F.

4. The process of claim 1 wherein the fluoborate is fused by heating to 1400–1500° F.

5. The process of claim 4 wherein the ceramic is completely dried, prior to said fusing, at a temperature between 200 and 400° F.

6. The process of claim 1 wherein said ceramic is immersed in said fluoborate solution for .25 to 4 hours at 50 to 200° F.

7. The process of claim 6 wherein said fluoborate solution in an aqueous solution containing from 1 to 52% fluoborate.

8. The process of claim 2 wherein the acid etching medium is selected from the group consisting of sulfuric acid and hydrofluoric acid.

9. The process of claim 1 wherein the fluoborate is selected from the group consisting of copper, silver, nickel, tin and lead fluoborates.

10. The process of claim 1 wherein said ceramic comprises a titanate and a zirconate.

References Cited in the file of this patent

UNITED STATES PATENTS

| | | |
|---|---|---|
| 1,999,529 | Smith | Apr. 30, 1935 |
| 2,421,079 | Narcus | May 27, 1947 |
| 2,930,106 | Wrotnowski | Mar. 29, 1960 |